(12) United States Patent
Kim

(10) Patent No.: US 7,303,836 B2
(45) Date of Patent: Dec. 4, 2007

(54) SECONDARY BATTERY INCLUDING IMPROVED CAP ASSEMBLY AND METHOD OF MANUFACTURING THE CAP ASSEMBLY

(75) Inventor: Bong-Ki Kim, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 545 days.

(21) Appl. No.: 10/688,914

(22) Filed: Oct. 21, 2003

(65) Prior Publication Data

US 2004/0091770 A1    May 13, 2004

(30) Foreign Application Priority Data

Oct. 21, 2002    (KR)    ................... 2002-64342

(51) Int. Cl.
*H01M 2/08* (2006.01)
*H01M 2/26* (2006.01)

(52) U.S. Cl. ...................... 429/180; 429/181

(58) Field of Classification Search ......... 429/179–181
See application file for complete search history.

(56) References Cited

U.S. PATENT DOCUMENTS 6,509,115 B2    1/2003    Kim et al.

FOREIGN PATENT DOCUMENTS

| GB | 2111295 A | * | 6/1983 |
|---|---|---|---|
| JP | 61008846 A | * | 1/1986 |
| JP | 62093855 A | * | 4/1987 |
| JP | 03049152 A | * | 3/1991 |
| JP | 2000-231917 | | 8/2000 |
| JP | 2001185100 A | * | 7/2001 |
| JP | 2002367577 A | * | 12/2002 |
| KR | 2000-14970 | | 3/2000 |
| KR | 2001-31769 | | 4/2001 |

OTHER PUBLICATIONS

Office Action issued in Japanese Patent Application No. 200310119608.8 on Apr. 14, 2006.
Korean Office Action dated Sep. 21, 2004.

* cited by examiner

*Primary Examiner*—Gregg Cantelmo
(74) *Attorney, Agent, or Firm*—Stein, McEwen & Bui, LLP

(57) ABSTRACT

A cap assembly including a cap plate having a port aperture, an electrode port inserted into the port aperture, and an insulating member formed between the cap plate and the electrode port to insulate the cap plate and the electrode port and to tightly bind the electrode port to the cap plate, wherein the insulating member, the cap plate, and the electrode port form a single integrated body.

15 Claims, 3 Drawing Sheets

SECONDARY BATTERY INCLUDING IMPROVED CAP ASSEMBLY AND METHOD OF MANUFACTURING THE CAP ASSEMBLY

CROSS-REFERENCE TO RELATED APPLICATIONS

This application claims the priority of Korean Patent Application No. 2002-64342, filed on Oct. 21, 2002, in the Korean Intellectual Property Office, the disclosure of which is incorporated herein in its entirety by reference.

BACKGROUND OF THE INVENTION

1. Field of the Invention

The present invention relates to a secondary battery, and, more particularly, to a secondary battery including a cap assembly with a tighter binding structure that binds an electrode port and a cap plate, and a method of manufacturing the cap assembly.

2. Description of the Related Art

Secondary batteries, which are distinguished from primary batteries due to their ability to be repeatedly charged and discharged, have been widely used in cellular phones, notebook computers, camcorders, and other portable electronic devices. Lithium secondary batteries having an operating voltage of 3.6V or greater, which is three times higher than nickel-cadmium (Ni—Cd) batteries, popularized as a power source for various kinds of electronic equipment, and nickel-hydrogen batteries, are nowadays frequently used because of their high energy density per unit of weight.

Such lithium secondary batteries mostly use lithium oxide as a negative active material, and a carbonaceous material as a positive active material. Lithium secondary batteries can be classified into liquid electrolyte batteries, also known as lithium ion batteries, and polymer electrolyte batteries, also known as lithium polymer batteries, according to the type of electrolyte used. Lithium secondary batteries are manufactured in various shapes, typically in cylindrical, rectangular, or pouch forms. An example of a rectangular secondary battery with a cap assembly is disclosed in U.S. Pat. No. 6,509,115.

FIG. 1 is an exploded perspective view of a conventional cap assembly for a rectangular secondary battery. As shown in FIG. 1, a cap assembly 10 includes a cap plate 11 covering a top opening of a can, which accommodates a battery unit, an electrode port 12 coupled to the cap plate 11 via a gasket 13 acting as an insulator, and an insulating plate 14 placed underneath the cap plate 11. The electrode port 12 coupled to the cap plate 11 is electrically connected to a negative tab or a positive tab drawn out from the battery unit to act as a negative port or a positive port.

FIG. 2 is a sectional view of the assembled cap assembly of FIG. 1. As shown in FIG. 2, the electrode port 12 is inserted into a port aperture 11a (see FIG. 1) of the cap plate 11. The cap plate 11 and the electrode port 12 are insulated from one another via the gasket 13. The insulating plate 14 is positioned underneath the cap plate 11 to insulate an end of the electrode port 12, protruding out of the port aperture 11a of the cap plate 11, from the cap plate 11. The protruding end of the electrode port 12 is stretched out, via spinning, to support the insulating plate 14 upward, as illustrated in FIG. 2. Accordingly, the electrode port 12 is fixed to the cap plate 11 and the insulating plate 14.

In the cap assembly 13 having the above-described structure, since the electrode port 12 is slid into the gasket 13, the electrode port 12 is movable with respect to the gasket 13 by external impacts. Accordingly, the negative tab or positive tab that supports the end of the electrode port 12 is also movable, increasing the possibility of a short circuit due to a contact between the electrode tab and the inner wall of the can.

In addition, it is highly likely that an electrolyte injected into the can will leak through a gap between the electrode port 12 and the gasket 13. Furthermore, since the gasket 13 and the insulating plate 14 are designed as separate parts, the cap assembly is assembled from more parts and the assembling process is complicated.

SUMMARY OF THE INVENTION

The present invention provides a secondary battery having a cap assembly with a simpler, tighter structure including an insulating member between an electrode port and a cap plate for tighter binding thereof, and a method of manufacturing the cap assembly.

Additional aspects and/or advantages of the invention will be set forth in part in the description which follows and, in part, will be obvious from the description, or may be learned by practice of the invention.

In accordance with an aspect of the present invention, there is provided a cap assembly comprising: a cap plate having a port aperture; an electrode port inserted into the port aperture; and an insulating member formed between the cap plate and the electrode port to insulate the cap plate and the electrode port and to tightly bind the electrode port to the cap plate, wherein the insulating member, the cap plate, and the electrode port form a single integrated body.

According to specific embodiments of the cap assembly, the insulating member may be formed by insert-injection molding. The cap assembly may further comprise an auxiliary binding unit on a surface of the cap plate, wherein the auxiliary binding unit provides tighter binding of the insulating member to the cap plate. The electrode port may comprise a head and an insertion extending from the head and inserted into the port aperture, the diameter of the insertion increasing in a direction opposite to the head. An end portion of the electrode port that protrudes out of the port aperture may be stretched out by spinning to support a surface of the insulating member upward, providing tighter binding between the electrode port and the insulating member. The cap assembly may further comprise a port plate on a surface of the insulating member, the port plate being electrically connected to the electrode port.

In accordance with another aspect of the present invention, there is provided a secondary battery comprising: a battery unit comprising a negative plate, a separator, and a positive plate stacked upon one another and rolled; a can in which the battery unit is accommodated; a cap assembly covering a top opening of the can, the cap assembly comprising: a cap plate having a port aperture, an electrode port inserted into the can through the port aperture, and an insulating member formed between the cap plate and the electrode port to insulate the cap plate and the electrode port and to tightly bind the electrode port to the cap plate, wherein the insulating member, the cap plate, and the electrode port form a single integrated body; and electrode tabs drawn out from the negative plate and the positive plate of the battery unit and selectively electrically connected to the can.

In accordance with another aspect of the present invention, there is provided a method of manufacturing a cap assembly, the method comprising: inserting an electrode port into a port aperture of a cap plate such that there is a predetermined gap between the electrode port and an inner wall of the port aperture; and injecting a molding resin into the gap between the electrode port and the cap plate to form an insulating member that insulates and tightly binds the electrode port to the cap plate.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
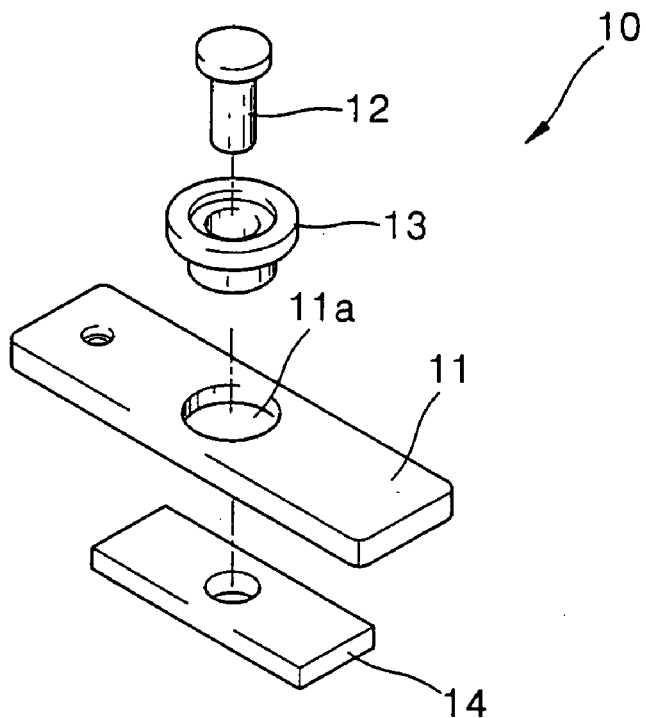
FIG. 1 is an exploded perspective view of a conventional cap assembly for a secondary battery.
Figure 2:
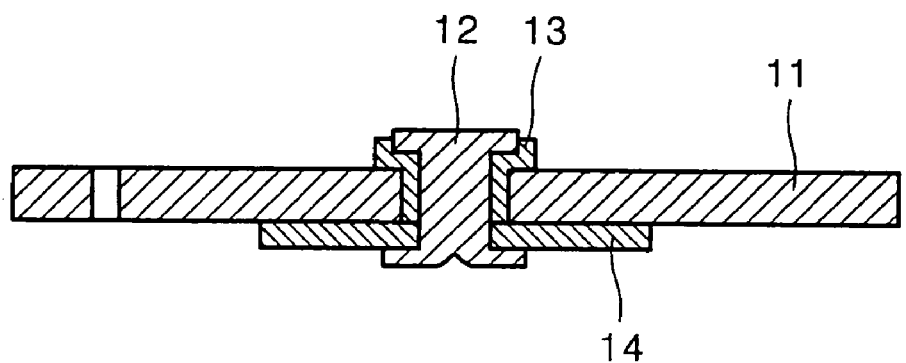
FIG. 2 is a sectional view of the assembled cap assembly of FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
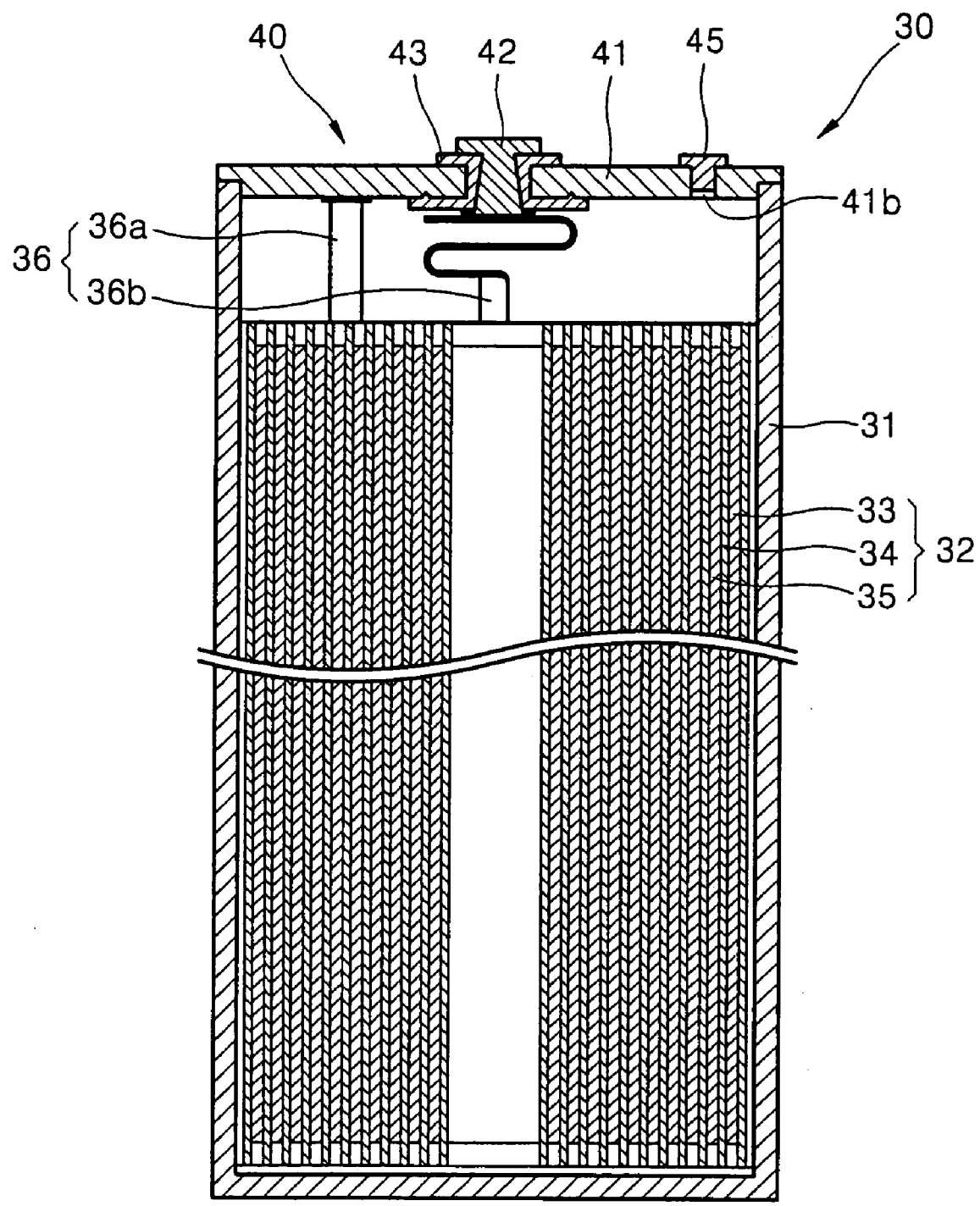
FIG. 3 is a sectional view of a secondary battery according to an embodiment of the present invention.

A secondary battery according to an embodiment of the present invention is shown in FIG. 3. Referring to FIG. 3, a secondary battery 30 includes a can 31, a battery unit 32 which is accommodated in the can 31, and a cap assembly 40 which covers an upper edge of the can 31.

The can 31, which is rectangular, is made of metal, so it can act as a port by being electrically connected to one of electrode tabs 36. The battery unit 32, which is accommodated in the can 31, includes a negative plate 33, a separator 34, and a positive plate 35, which are stacked upon one another and rolled together.

For example, in a lithium secondary battery, the battery unit 32 includes a negative plate formed by coating a lithium oxide-based slurry on at least one surface of a negative collector made of a thin aluminum plate, and a positive plate formed by coating a carbonaceous material-based slurry on at least one surface of a positive collector made of a thin copper plate.

The electrode tabs 36 are drawn out above the battery unit 32. A negative tab 36a and a positive tab 36b are connected with the respective negative plate 33 and positive plate 36. The negative tab 36a and the positive tab 36b may be fixed to the respective negative plate 33 and positive plate 35 by, for example, welding. The negative tab 36a and the positive tab 36b may be connected to electrodes of opposite polarity according to the design of a battery.

Figure 4:
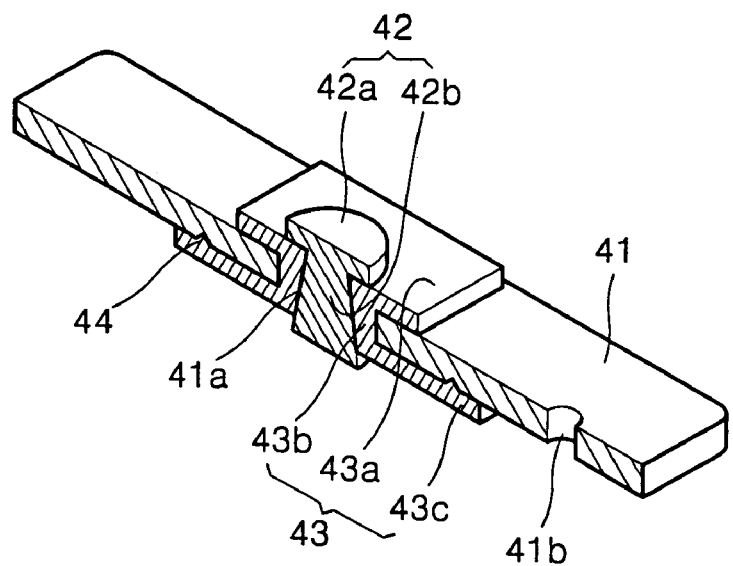
FIG. 4 is a partial cutaway perspective view of a cap assembly in FIG. 3.

The cap assembly 40, as illustrated in FIG. 4, is fitted into a top opening of the can 31. The cap assembly 40 includes a cap plate 41. The cap plate 41 fits the top opening of the can 31 and has a port aperture 41a at the center thereof. An electrode port 42 is inserted through the port aperture 41a into the can 31.

The electrode port 42 includes a cylindrical head 42a, which protrudes above the cap plate 41 and acts as a port, and an insertion 42b extending from the head 42a, which is inserted into the port aperture 41a. It may be preferable that the diameter of the insertion 42b increases in the direction opposite to the head 42a. However, the insertion 42b may have any shape, without limitation to the above.

An end portion of the insertion 42b protrudes a predetermined length out of the aperture holes 41a of the cap plate 41, and is electrically connected to the negative tab 36a or the positive tab 36b through, for example, welding. In FIG. 3, the end portion of the insertion 42b is electrically connected to the positive tab 36b.

As an aspect of the present invention, an insulating member 43 is interposed between the electrode port 42 and the cap plate 41. The insulating member 43 is made of an insulating material. The insulating member 43 includes a first insulator 43a interposed between the head 42a of the electrode port 42 and the top surface of the cap plate 41, a second insulator 43b interposed between the inner wall of the port aperture 41a and the outer surface of the insertion 42b of the electrode port 42, and a third insulator 43c laterally extending from the second insulator 43b to contact the bottom surface of the cap plate 41.

The insulating member 43, the cap plate 41, and the electrode port 42 may be formed as a single integrated body by insert-injection molding. In particular, initially, a mold having a shape corresponding to the first, second, and third insulators 43a, 43b, and 43c of the insulation member 43 is designed. The cap plate 41 and the electrode port 42 are inserted into the mold such that the head 42a of the electrode port 42 is spaced a predetermined distance apart from the top surface of the cap plate 41, and the insertion 42b of the electrode port 42 is spaced a predetermined distance apart from the inner wall of the port aperture 41a of the cap plate 41. Next, an insulting molding resin is injected into the mold to form the insulating member 43 between the cap plate 41 and the electrode port 42.

As described above, since the insulating member 43, the cap plate 41, and the electrode port 42 can be formed as a single integrated body, tighter binding between the electrode port 42 and the cap plate 41 via the insulating member 43 is ensured.

Alternatively, an auxiliary binding unit may be provided on the bottom surface of the cap plate 41 for tighter binding with the insulating member 43. The auxiliary binding unit includes at least one groove 44 formed on the bottom surface of the cap plate 41. In particular, when the cap plate 41 has at least one groove 44 on the bottom surface thereof, a molding resin injected to form the insulating member 43 between the cap plate 41 and the electrode port 42 is allowed to flow in the groove 44. As a result, the insulating member 43 has a protrusion embedded in the cap plate 41, and is more tightly coupled with the same.

An electrolyte injection hole 41b, through which an electrolyte is injected into the can 31, is formed near an end of the cap plate 41. After an electrolyte is injected via the electrolyte injection hole 41b into the can 31, the electrolyte injection hole 41b is plugged up with a plug member 45, as illustrated in FIG. 3.

Figure 5:
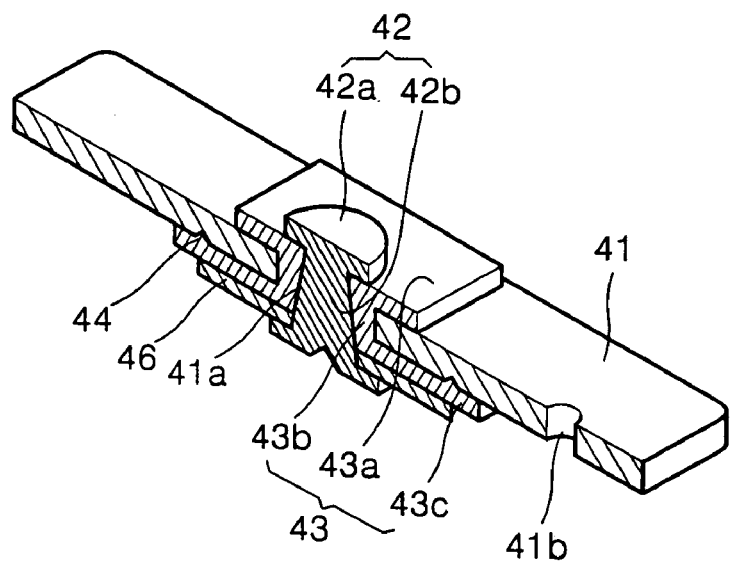
FIG. 5 is a partial cutaway perspective view of a cap assembly according to another embodiment of the present invention.

The cap assembly 40 may further include a port plate 46 electrically connected with the electrode port 42, as illustrated in FIG. 5. The port plate 46 is located underneath the third insulator 43c of the insulating member 43. The port plate 46 has a hole aligned with the port aperture 41a to allow the insertion 42b of the electrode port 42 to pass through it. The port plate 46 may be bound to the third insulator 43a of the insulating member 43 by insert-injection molding. The port plate 46 may be electrically connected with the negative tab 36a or the positive tab 36b by welding.

For tighter binding of the port plate 46 with the insulating member 43 and the electrode port 42, a protruding end of the electrode port 42 may be stretched out through spinning to tightly support the port plate 46 upward, as illustrated in FIG. 5. It will be appreciated that stretching out the protruding end of the electrode port 42 by spinning can also be applied to the cap assembly of FIG. 4. In this case, the stretched end of the electrode port 42 tightly contacts the third insulator 43c of the insulating member 43.

A method of manufacturing a cap assembly with either of the structures described above according to the present invention will now be described.

Initially, the cap plate 41 with the port aperture 41a and the electrode port 42, having the head 42a acting as a port and the insertion 42b extending from the head 42a, which is inserted into the port aperture 41a, are prepared.

Next, a mold having a shape corresponding to the insulating member 43 having the first, second, and third insulators 43a, 43b, and 43c, respectively, as illustrated in FIG. 4, is designed. The mold also has a space for accommodating the cap plate 41 and the electrode port 42. The cap plate 41 and the electrode port 42 are inserted into the mold such that the head 42a of the electrode port 42 is spaced a predetermined distance apart from the top surface of the cap plate 41, and the insertion 42b of the electrode port 42 is spaced a predetermined distance apart from the inner wall of the port aperture 41a of the cap plate 41. In this state, an insulating molding resin is injected into the mold to fill the space between the cap plate 41 and the electrode port 42 and form the insulating member 43 therein. As a result, the cap assembly having the structure as illustrated in FIG. 4 is manufactured.

Alternatively, a spinning process may be further performed to stretch out an end portion of the insertion 42b of the electrode port 42 to tightly support the third insulator 43c of the insulating member 43 upward.

For the cap assembly 40 of FIG. 5, which has the port plate 46, a mold having a space for accommodating the port plate 46 with a predetermined gap from the cap plate 41 is designed. Next, insert-injection molding is performed with the mold to form the cap assembly 40 of FIG. 5 with the port plate 46 on the bottom of the third insulator 43c of the insulating member 43. Alternatively, the above-described spinning process may be performed on an edge portion of the insertion 42b of the electrode port 42 that protrudes out of the port plate 46.

As described above, according to the present invention, an insulating member ensures tighter binding of an electrode port to a cap plate, thereby preventing short-circuiting occurring when an electrode tab connected to an electrode port that is movable with respect to the cap plate slips and contacts the inner wall of the can.

In addition, the insulating member is formed between the electrode plate and the cap plate such that the three elements form a single integrated body, via injection molding, which differs from conventional assembly processes. Accordingly, leakage of an electrolyte from the can is prevented, and the overall assembly process is simplified because no separate gasket and insulating plate are required.

Furthermore, the insulating member can be easily manufactured in various shapes by an insert-injection mold.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cap assembly comprising:
   a cap plate having a port aperture;
   an electrode port, including a head and an insertion whose diameter steadily increases from the head to an end thereof, the insertion being inserted into the port aperture with a predetermined distance maintained between the head and the cap plate, wherein the diameter of the head of the electrode part is greater than the upper diameter of the insertion of the electrode part;
   an insulating member formed to extend from, at least, a lower surface of the cap plate to a lower portion of the head of the electrode port to insulate the cap plate and the electrode port and to bind the electrode port to the cap plate; and
   an auxiliary binding unit on a surface of the cap plate, wherein the auxiliary binding unit provides additional binding of the insulating member to the cap plate, wherein the auxiliary binding unit provides additional binding of the insulating member to the cap plate, wherein the auxiliary binding unit comprises at least one groove formed on the surface of the cap plate, and a portion of the insulating member protrudes into the at least one groove,
   wherein the insulating member, the cap plate, and the electrode port form a single integrated body.

2. The cap assembly of claim 1, wherein the insulating member is formed by insert-injection molding.

3. The cap assembly of claim 1, wherein the insulating member comprises:
   a first insulator interposed between the head of the electrode port and a top surface of the cap plate;
   a second insulator interposed between an inner wall of the port aperture and an outer surface of the insertion of the electrode port; and
   a third insulator laterally extending from the second insulator to contact a bottom surface of the cap plate.

4. The cap assembly of claim 1, wherein an end portion of the electrode port protruding out of the port aperture is stretched out by spinning to support a surface of the insulating member upward, providing tighter binding between the electrode port and the insulating member.

5. The cap assembly of claim 1, further comprising a port plate on a surface of the insulating member, the port plate being electrically connected to the electrode port.

6. The cap assembly of claim 5, wherein an end portion of the electrode port protruding out of the port aperture is stretched out by spinning to support a surface of the port plate upward, providing tighter binding between the electrode port and the port plate.

7. The cap assembly of claim 1, wherein the diameter of the insertion linearly increases from the head to the end thereof.

8. The cap assembly of claim 1, wherein the end of the insertion is located at the leading end of the electrode port when the electrode port is inserted into the port aperture.

9. A secondary battery comprising:
   a battery unit comprising a negative plate, a separator, and a positive plate stacked upon one another and rolled;
   a can in which the battery unit is accommodated;
   a cap assembly covering a top opening of the can, the cap assembly comprising:
   a cap plate having a port aperture, an electrode port, including a head and an insertion whose diameter steadily increases from the head to an end thereof, the insertion being inserted into the port aperture with a predetermined distance maintained between the head and the cap plate; and an insulating member formed to extend from, at least, a lower surface of the cap plate to a lower portion of the head of the electrode port to insulate the cap plate and the electrode port and to bind the electrode port to the cap plate, wherein the insulating member, the cap plate, and the electrode port form a single integrated body; and electrode tabs drawn out from the negative plate and the positive plate of the battery unit and selectively electrically connected to the can.

10. The secondary battery of claim 9, wherein the insulating member is formed by insert-injection molding.

11. The secondary battery of claim 9, further comprising an auxiliary binding unit on a surface of the cap plate, wherein the auxiliary binding unit provides additional binding of the insulating member to the cap plate.

12. The secondary battery of claim 9, wherein the insulating member comprises:

a first insulator interposed between the head of the electrode port and a top surface of the cap plate;

a second insulator interposed between an inner wall of the port aperture and an outer surface of the insertion of the electrode port; and a third insulator laterally extending from the second insulator to contact a bottom surface of the cap plate.

13. The cap assembly of claim 9, wherein the diameter of the insertion linearly increases from the head to the end thereof.

14. The cap assembly of claim 9, wherein the end of the insertion extends into the can.

15. The cap assembly of claim 9, wherein one of the tabs is connected to the end of the insertion.

* * * * *